United States Patent [19]

Cook et al.

[11] 4,376,759

[45] Mar. 15, 1983

[54] CYCLIC PROCESS FOR MAKING HYDROGEN

[76] Inventors: Newell C. Cook, 1634 E. Lake Joanna Dr., Eustis, Fla. 32726; Gary C. Davis, 5 Felicia Ct., Albany, N.Y. 12205

[21] Appl. No.: 233,177

[22] Filed: Feb. 10, 1981

[51] Int. Cl.$^3$ ................................................. C01B 1/02
[52] U.S. Cl. ................................. 423/648 R; 423/235
[58] Field of Search ............................ 423/235, 648 R

[56] References Cited

U.S. PATENT DOCUMENTS

| | | | |
|---|---|---|---|
| 2,210,439 | 8/1940 | Agel | 423/235 |
| 2,325,066 | 7/1943 | Marcotte | 423/235 |
| 4,008,315 | 2/1977 | Philippi et al. | 423/235 |
| 4,024,219 | 5/1977 | Takahashi et al. | 423/235 |
| 4,219,534 | 8/1980 | Ethington | 423/235 |

*Primary Examiner*—O. R. Vertiz
*Assistant Examiner*—Wayne A. Langel
*Attorney, Agent, or Firm*—Heslin & Watts

[57] ABSTRACT

Nitric oxide, an odd-electron molecule, has been found to react with m-phosphoric acid to displace hydrogen and form nitrosyl m-phosphate. The addition of water to the nitrosyl salt regenerates the m-phosphoric acid, half the nitric oxide and the other half as nitrogen dioxide which can then be converted to nitric oxide in an oxidation process. These reactions thus form a cyclic process for obtaining hydrogen from water with low level energy.

8 Claims, No Drawings

CYCLIC PROCESS FOR MAKING HYDROGEN

This invention is concerned with a new and novel method for making hydrogen. More particularly this invention is concerned with a cyclic process for displacing hydrogen from certain acids by using nitric oxide as a "gaseous metal," and then regenerating the reactants by addition of water. The overall process effects the splitting of water into hydrogen and oxygen with low level heat.

Active metals such as sodium displace hydrogen from water through the reducing action of the 9-electron outer structure (4 pairs+1 odd) of the sodium atom.

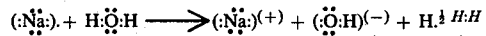

The reaction occurs because of the instability of the electronic structure of the sodium atom relative to the greater stability of the three products, i.e., the eight-electron systems of the sodium and hydroxyl ions and the two-electron system of the hydrogen molecule. This method of making hydrogen is very energy-consuming, however, since it requires electrolytic processes (high level energy) to make sodium or any other such active metal.

In the nitric oxide molecule the electronic reactivity is similar to that of the sodium atom but involves eleven electrons. Six electrons between the nitrogen and oxygen hold the atoms together with the force of Ca. 80% of a conventional triple bond, and a pair of unshared electrons is located on both the nitrogen and oxygen. The eleventh and odd electron is located mainly in the vicinity of the nitrogen atom.

By losing the odd electron nitric oxide can become the much more stable ten-electron nitrosyl ion.

The great thermal stability of ten-electron systems is exemplified in the following molecules and ions:

| | |
|---|---|
| :N⋮⋮N: | Nitrogen |
| :C⋮⋮O: | Carbon monoxide |
| :C⋮⋮N:$^{(-)}$ | Cyanide ion |
| H:C⋮⋮C:H | Acetylene |
| :C⋮⋮C:$^{(=)}$ | Acetylide ion |

Nitrogen is stable at temperatures over 3000° C. and the other molecules and molecular ions to temperatures in excess of 2000° C.

Nitric oxide loses its odd electron fairly easily (IP 9.23 eV) to form the nitrosyl ion $(N\equiv O)^+$ with a resultant increase in bond strength and vibration frequency (from 1840 to 2150–2400 cm$^{-1}$) and decrease in bond length (0.09 Å) as a full triple bond is formed. The great stability of the triple-bonded nitrosyl cation is observed in nitrosyl sulfuric acid,

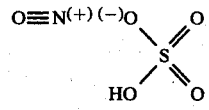

which loses water at its melting point of 73° C. and changes into nitrosyl sulfuric anhydride,

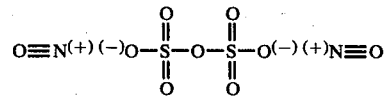

M.P. 217° C.
B.P. 360° C. (stable)

Both of these nitrosyl sulfates have been used extensively in the past to oxidize SO$_2$ in the presence of water to H$_2$SO$_4$ on an industrial scale. The nitrosyl ion in turn gets reduced to nitric oxide.

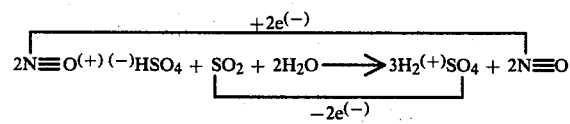

If SO$_2$ is not present the reaction is

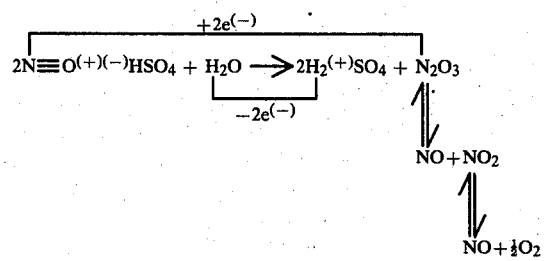

The reducing ability of NO has been observed in its reduction of Cr$^{+3}$ to Cr$^{+2}$, Fe$^{+3}$ to Fe$^{+2}$ and Ni$^{+2}$ to Ni$^+$. Since the reduction of these ions approximates the difficulty of reducing H$^+$ to H$_2$, it seemed reasonable that nitric oxide acting as a "gaseous metal" might displace hydrogen from selected protonic acid and form nitrosyl salts of the acids; and that the nitric oxide could then be regenerated by adding water to the nitrosyl salts as shown above. The reduction, or hydrogen displacement, step would be

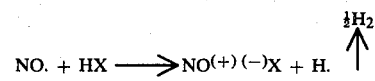

and the oxidation or regeneration step would be

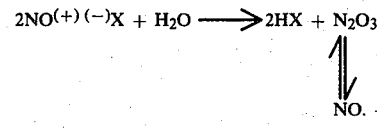

With the proper reagents, conditions and engineering techniques it should be possible to combine the reducing action of nitric oxide and the oxidizing reaction of the nitrosyl ion into a redox process, $$NO \rightleftharpoons NO^{(+)} + e^{(-)},$$

that would decompose water into hydrogen and oxygen with much greater energy efficiency than the electrolysis of water. Nitric oxide cannot be used directly with water or many acids to form hydrogen because other non-redox reactions prevent or dominate over the reactions described above. Some simple hydrogen compounds, such as $H_2S$, might be reduced by NO if side reactions could be suppressed.

elements in the anion portion of the acid are resistant to the reducing action of nitric oxide.

Since the overall process for the splitting of water is endothermic by approximately 50 kcal this energy will have to be available to the reaction and could probably be supplied at a temperature of moderate level as low-grade waste energy or solar energy. It should also be possible to make the process a completely closed loop except for the addition of energy and water.

A schematic representation of the process with some critical requirements and contributing factors would be as follows:

Cyclic Process for Making Hydrogen

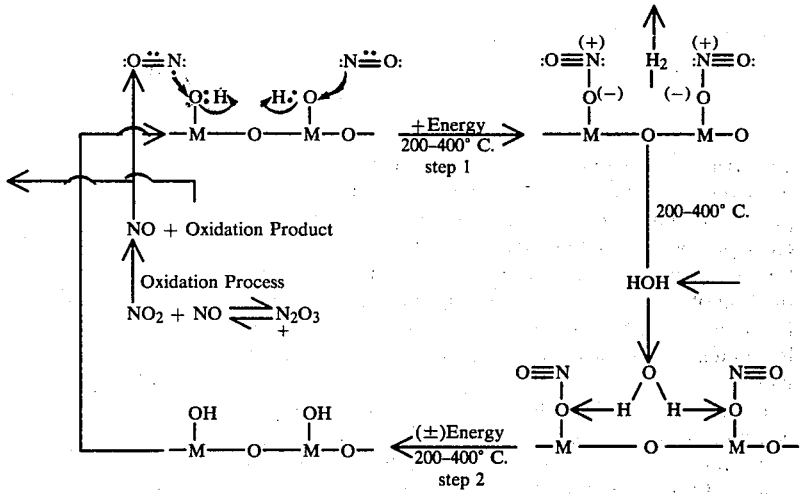

To test the principles of the idea and explore some of the parameters nitric oxide and sulfuric acid (Example 1) were reacted under pressure at room temperature and found to form $SO_2$ and traces of $H_2S$. The main reaction was clearly the reduction of sulfate to sulfite but the small and significant amount of $H_2S$ indicated that some hydrogen had formed and that it then reacted to reduce $SO_2$ to $H_2S$ as follows:

Main Reaction:

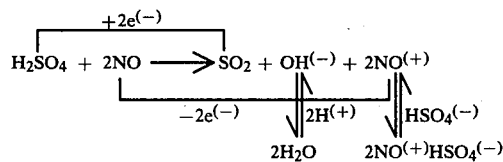

Trace Reaction:

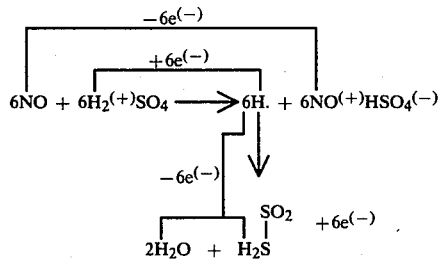

These results indicate that acids containing complex anions can be used to make hydrogen only if all the Requirements and Contributing Factors:

1. Theoretically M can be P, B, Al, Si, Ti, Zr, Hf and Rare Earth metals, but it is probably limited to P, B, Si, and Al.

2. The M-O bonds must be stable to the reducing action of NO. Sulfur-oxygen bonds in sulfuric acid are not stable to NO.

3. Nitric oxide must be capable of forming a stable nitrosyl salt with the acid from which $H_2$ is being displaced.

4. The metalloid or metal must be capable of forming a stable meta-acid (such as meta-phosphoric or meta-boric) so that no $H_2O$ will be present in Step 1 of the process.

5. The reaction must be operated at temperatures below where $H_2$ and NO will react, i.e. $\sim 500°$ C. The use of palladium diffusers should allow $H_2$ to diffuse from the reaction area and facilitate the survival of $H_2$.

6. The fact that phosphorous is pentavalent and therefore can have a double-bonded oxygen attached to it in meta-phosphoric acid may enhance the formation of nitrosyl salt through resonance contributions arising from obrital-overlaps of pi electrons. Phosphorous may do this better than any other element.

7. The overall input of energy for splitting $H_2O$ in this process may be lowered from ca. 50 to 30-40 kcal since $N_2O_3$ and $NO_2$ are formed instead of $O_2$. Furthermore, Step 2 of the process may be nearly as endothermic as Step 1. The sharing of the energy absorption between the two reactions would greatly enhance the chance for developing a practical process for splitting water with low level energy.

EXAMPLE 1

Approximately 50 cc of highly purified nitric oxide gas (99.95%) was condensed with liquid nitrogen using vacuum transfer into a 10-cc heavy wall glass tube (similar to that in FIG. 1) holding 5 cc of 100% $H_2SO_4$ ($\pm 0.05\%$) made by adding reagent grade $SO_3$ to reagent grade $H_2SO_4$ of known concentration and then checking the concentration by titration with base). The tube was sealed off while at liquid nitrogen temperature and under vacuum and then warmed to room temperature where it was held for twenty hours with occasional shaking. The tube was then scratched with a file, placed in a breaker (FIG. 2) and after evacuation was broken. A portion of the gas released into the breaker tube was analyzed by mass spectrometry and found to contain 70% NO, 30% $SO_2$ and 0.05–0.1% $H_2S$.

Introduction to Examples Using m-Phosphoric Acid

At 150°–300° C. all glasses, ceramics and conventional metals show pronounced solubility or reactivity in phosphoric acids. Gold, platinum and palladium are essentially unaffected. Accordingly, it was not surprising that preliminary efforts to dehydrate o-phosphoric acid ($H_3PO_4$) to m-phosphoric acid $(HPO_3)_n$ in glass, quartz and metal under high vacuum always dissolved so much of the containers that the product was deemed unsatisfactory for definitive testing. Furthermore, complete dehydration was very difficult when the film of acid on the wall of the rotating flask was more than 1–2 mm thick. In addition, transferring of the polymeric, intractable glass-like meta-acid was almost impossible. For these reasons, and because it was desired to visually observe the first experiments it was decided to prepare and react the m-phosphoric acid as described below in examples 2 and 3. Using the described technique the static films of the acid minimized the glass that dissolved, and the thin films optimized the loss of water to form the polymeric m-acid.

EXAMPLE 2

Pure $H_3PO_4$ (0.887 g, prepared from directions in Inorganic Syntheses, Vol. 3) was placed in a heavy-walled glass tube (FIG. 1) and dehydrated to m-phosphoric acid by slowly increasing the temperature of the furnace (FIG. 1) from 25° to 325° C. over a period of two days under vacuum (<0.001 mm). At no time did any material froth or splash into the restricted area where seal-off would be made. Periodic weighing of the tube and the water collected in the liquid nitrogen trap showed that the weight loss (0.140 g) reached a stable plateau at ca. 275° C. and lost no more water up to ca. 340° C. This loss corresponded to the theoretical amount for converting $H_3PO_4$ to $HPO_3$. At this point the $HPO_3$ was extremely viscous and flowed very slowly even at 300° C. when the tube was positioned in an almost horizontal position to spread it out into a thin film to optimize the surface area for reaction with NO in the next step. When cooled to 25° C. the $HPO_3$ was a clear glassy solid except for two small areas which were slightly opaque.

Nitric oxide (Matheson, >99%), further purified by pumping at liquid nitrogen temperatures and three vacuum transfers, showed no detectable impurities by mass spectrometry analysis. This nitric oxide (0.022 g) was then condensed in the reaction tube with liquid nitrogen by vacuum transfer and the reaction tube sealed off by a hydrogen torch at the restricted area while the contents were at liquid nitrogen temperature. The technique of sealing allowed no contaminates to get into the reaction tube. Final weighings on both parts of the reaction tube confirmed the previous measurements that 0.737 g of $HPO_3$ and 0.022 g of NO were in the tube.

The reaction tube was then heated for twenty hours in the furnace at 300° C. On cooling to room temperature all the glassy solid was opaque, with some evidence of crystallinity especially near the walls. The reaction tube was scratched with a file and then placed in a breaker (FIG. 2) and after evacuating the breaker (<0.00001 mm) the tube was broken by bending the breaker at the ball joint. A portion of the gas released in the breaker tube was then analyzed with a mass spectrometer and found to contain:

NO: Main component, 80–90%

$H_2$: 0.015 mmol corresponding to 4% of the amount theoretically possible, based on NO available $N_2$: 0.060 mmol. The most likely way to form $N_2$ is:

$$NO + H_2 \rightarrow \tfrac{1}{2}N_2 + H_2O$$

If the $N_2$ is expressed in terms of millimoles of $H_2$ according to the above equation and this quantity (0.120 mmol) added to the $H_2$ found (0.015 mmol) the total mmol of $H_2$ produced would be 0.135, which corresponds to 37% of the NO having reacted to displace hydrogen from the m-phosphoric acid.

Standard samples of mixtures of pure NO, $H_2 + N_2$ and NO and $N_2$ were used to calibrate the mass spectrometer before the reaction products were analyzed. Hydrogen concentrations in the reaction products were several orders of magnitude greater than the lower limit that could be detected.

EXAMPLE 3

To demonstrate the regeneration reaction of the cyclic process, water was added to the nitrosyl m-phosphate formed in the glass tube as follows: using a nitrogen glove box half of the broken reaction tube described in Example 2 was transferred to a 10-cc volume glass tube (FIG. 3) fitted with a rubber septum and means for evacuation. After evacuation (<0.001 mm) thoroughly degassed $H_2O$ (ca. 1 cc) was added to the reaction product through the septum system by means of a hypodermic syringe. The gaseous bubbles which formed as the water first contacted the solid was reddish brown, indicating $NO_2$, but the color soon disappeared. Analysis of the gas by mass spectrometry showed large amounts of NO and some $H_2$ and $N_2$, in approximately the same ratio found in the hydrogen generation step. Obviously the glassy opaque reaction product had not been degassed sufficiently to remove all the entrapped $H_2$ and $N_2$ absorbed in small bubbles in the glassy structure.

The other half of the reaction tube was then placed in the same 10-cc apparatus, evacuated longer and more thoroughly (<0.00001 mm) and then treated with water in the same manner. Again the reddish color of $NO_2$ was observed when the water was first added, but only NO (no $H_2$ or $N_2$) was observed, and in amounts far too large for gas that had been physically absorbed. Nitrogen dioxide cannot be determined by mass spectrometry.

We claim:

1. The cyclic process of producing hydrogen from water which comprises the steps of contacting nitric oxide with an anhydrous acid selected from the group consisting of meta-phosphoric acid, meta-boric acid, meta-silicic acid, meta-aluminic acid and mixtures thereof at a temperature between 200° and 400° C., separating and removing the resulting hydrogen gas from its co-product anhydrous nitrosyl meta-salt, then regenerating the said anhydrous meta-acid by contacting the anhydrous nitrosyl meta-salt with water and thereby simultaneously forming nitric oxide and nitrogen dioxide.

2. The process of claim 1, including the steps of separating and removing the nitrogen dioxide, reducing the nitrogen dioxide to nitric oxide, and contacting nitric oxide with the regenerated anhydrous acid in a repetition of the cycle.

3. The process of claim 1 in which the anhydrous acid is meta-phosphoric acid.

4. The process of claim 1 in which the anhydrous acid is meta-phosphoric acid and in which the nitric oxide is contacted with the meta-phosphoric acid at temperature between 200° and 400° C.

5. The process of claim 1, including the step of separating and removing the gaseous hydrogen from the reaction mixture as it is formed.

6. The process of claim 1 in which the hydrogen gas is removed from its co-product nitrosyl meta-salt by diffusing the hydrogen gas as it is formed through a hydrogen-permeable palladium membrane.

7. The process for the production of hydrogen which comprises the steps of bringing nitric oxide into contact with an anhydrous acid selected from the group consisting of meta-phosphoric acid, meta-boric acid, meta-silicic acid, meta-aluminic acid and mixtures thereof at a temperature between 200° and 400° C., reacting the nitric oxide with the said acid, and separating the resulting gaseous hydrogen from the reaction mixture.

8. The process of claim 7 in which the anhydrous acid is meta-phosphoric acid.

* * * * *

UNITED STATES PATENT AND TRADEMARK OFFICE
CERTIFICATE OF CORRECTION

PATENT NO. : 4,376,759

DATED : March 15, 1983

INVENTOR(S) : Newell C. Cook; Gary C. Davis

It is certified that error appears in the above-identified patent and that said Letters Patent is hereby corrected as shown below:

Col. 1, line 40   should read

-- : N :: O :   --.

Col. 1, line 45   should read

-- $\left( : N :: O : \right)^{+}$   --.

Col. 3, lines 47 - 52   should read

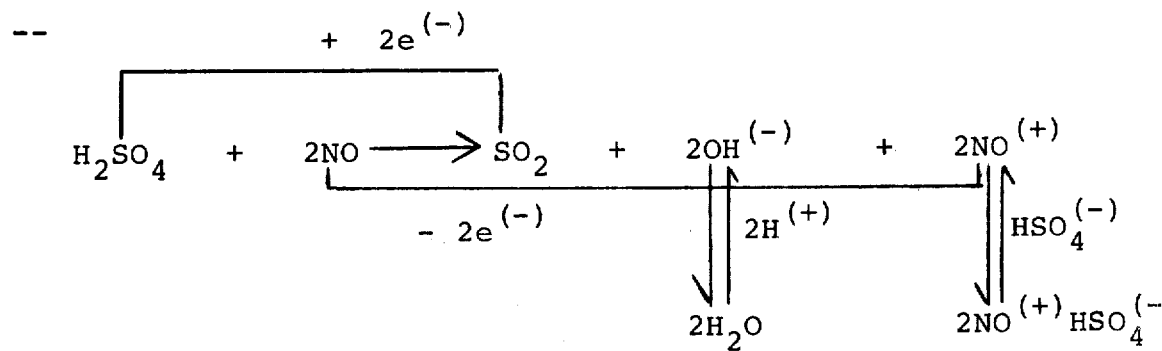

--.

UNITED STATES PATENT AND TRADEMARK OFFICE
CERTIFICATE OF CORRECTION

PATENT NO. : 4,376,759  Page 2 of 4
DATED : March 15, 1983
INVENTOR(S) : Newell C. Cook; Gary C. Davis It is certified that error appears in the above-identified patent and that said Letters Patent is hereby corrected as shown below:

Col. 3, lines 56 - 65   should read

--

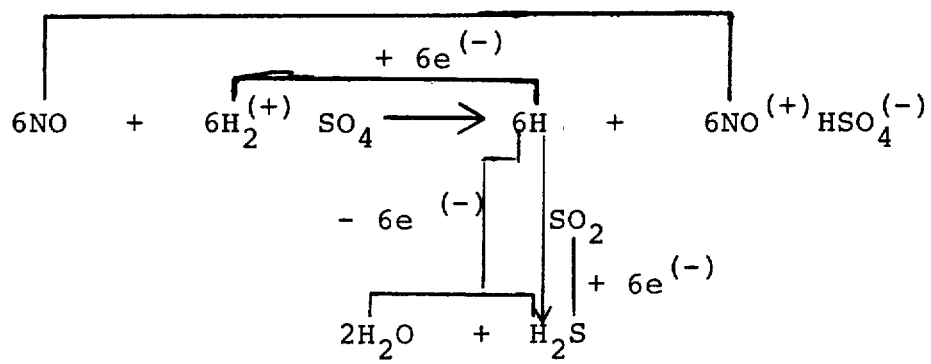

--.

UNITED STATES PATENT AND TRADEMARK OFFICE
CERTIFICATE OF CORRECTION

PATENT NO. : 4,376,759

DATED : March 15, 1983

INVENTOR(S) : Newell C. Cook; Gary C. Davis

It is certified that error appears in the above-identified patent and that said Letters Patent is hereby corrected as shown below:

Col. 4, lines 14 - 35 should read

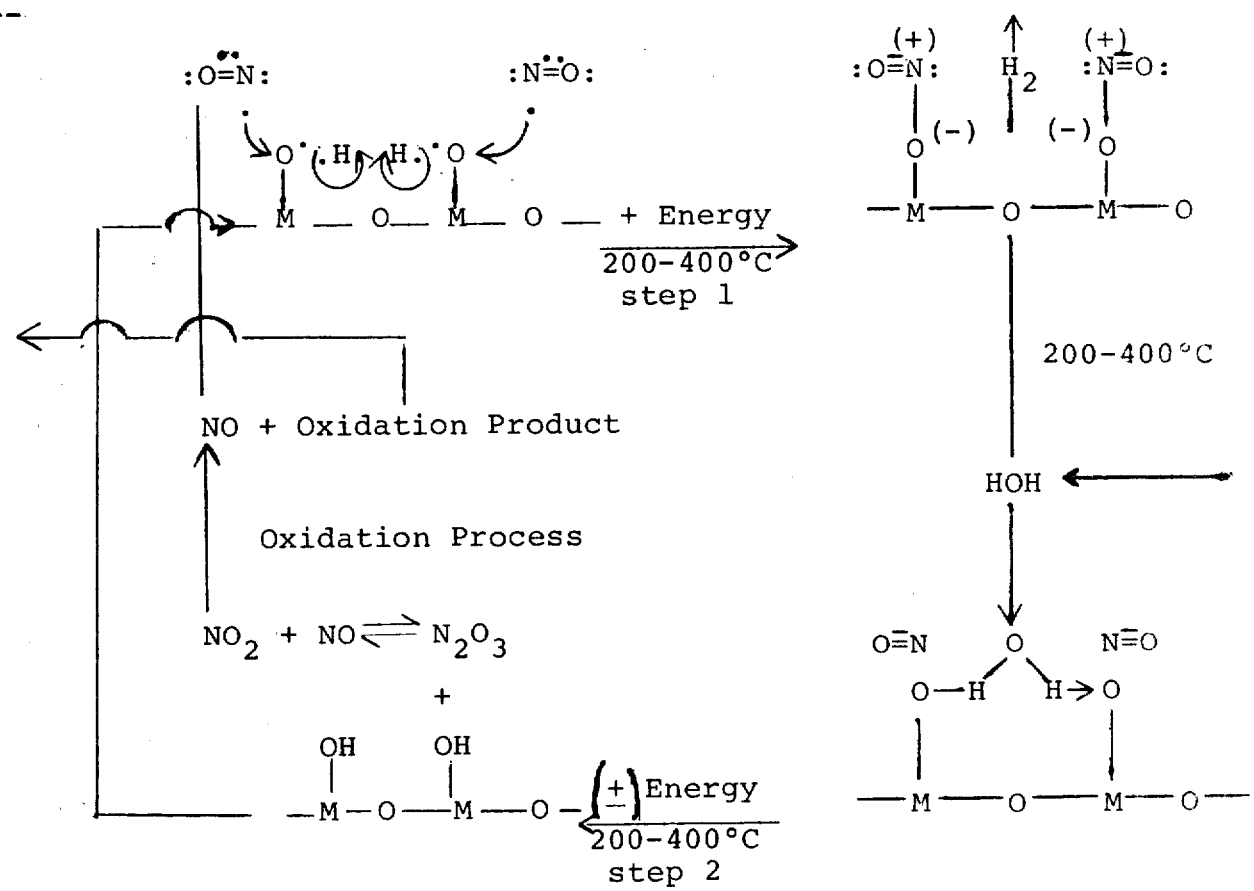

UNITED STATES PATENT AND TRADEMARK OFFICE
CERTIFICATE OF CORRECTION

PATENT NO. : 4,376,759  Page 4 of 4
DATED : March 15, 1983
INVENTOR(S) : Newell C. Cook; Gary C. Davis It is certified that error appears in the above-identified patent and that said Letters Patent is hereby corrected as shown below: Col. 4, lines 14-35 should read

--

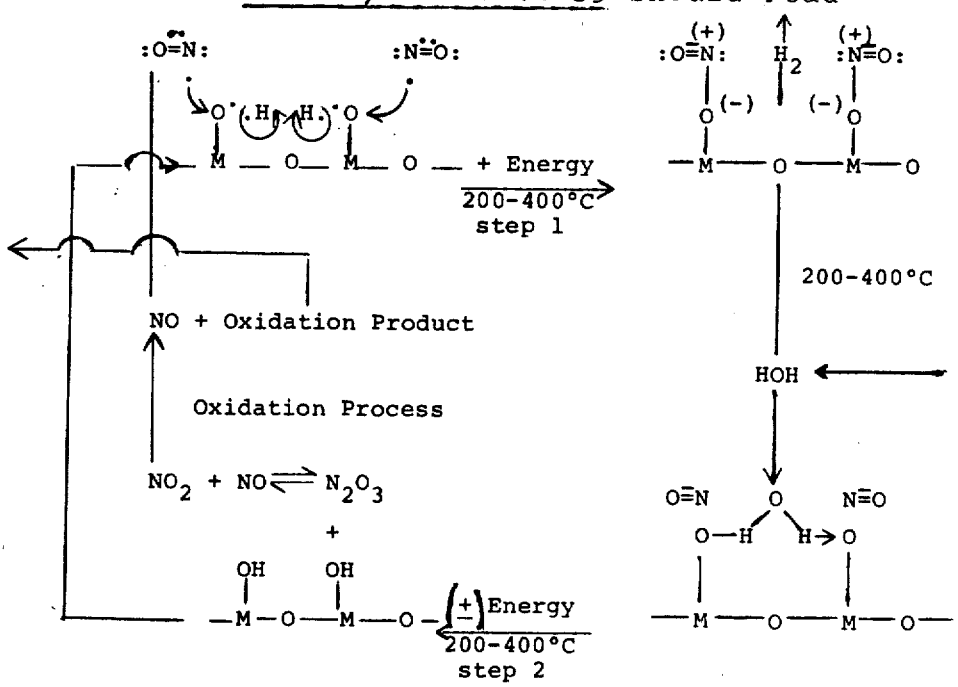

--.

𝔖igned and 𝔖ealed this

Fourth Day of October 1983

[SEAL]

Attest:

GERALD J. MOSSINGHOFF

Attesting Officer   Commissioner of Patents and Trademarks